United States Patent [19]

Mullins et al.

[11] Patent Number: 5,657,351
[45] Date of Patent: Aug. 12, 1997

[54] METHOD AND APPARATUS FOR EXTERNAL INTERMEDIATE DATA PROCESSING

[75] Inventors: Jacqueline Mullins; Joseph W. Peterson; John Bartkowiak; Alan F. Hendrickson, all of Austin, Tex.

[73] Assignee: Advanced Micro Devices, Sunnyvale, Calif.

[21] Appl. No.: 668,600

[22] Filed: Jun. 19, 1996

Related U.S. Application Data

[63] Continuation of Ser. No. 192,057, Feb. 4, 1994.

[51] Int. Cl.$^6$ .............................. H04B 14/08; H04B 14/06
[52] U.S. Cl. .......................... 375/244; 375/242; 375/246; 375/249; 375/254
[58] Field of Search ................................ 375/242, 244, 375/246, 249, 254; 341/143

[56] References Cited

U.S. PATENT DOCUMENTS

| | | | |
|---|---|---|---|
| 5,005,150 | 4/1991 | Dent | 364/736 |
| 5,070,515 | 12/1991 | Iwahashi | 375/27 |
| 5,084,904 | 1/1992 | Daito | 341/143 |
| 5,251,232 | 10/1993 | Nonami | 375/5 |
| 5,259,001 | 11/1993 | Corleto | 375/30 |
| 5,283,814 | 2/1994 | Iwahashi | 375/27 |
| 5,334,977 | 8/1994 | Kato | 375/27 |

*Primary Examiner*—Curtis Kuntz
*Assistant Examiner*—Vijay Shankar
*Attorney, Agent, or Firm*—Haynes and Boone, L.L.P.

[57] ABSTRACT

Disclosed is a system for selectively enabling intermediate data processing of digital signals external to an integrated circuit (IC). The system comprises a transcoder, a codec connected to the transcoder, and a data processor located externally to the IC. In response to a strobe signal, a programmable switch diverts digital signals between the transcoder and the codec to a data path from the IC to the external processor. The digital signals are formatted within the IC for processing by the external processor. The externally processed digital signals are returned to the IC via a data path from the external processor. The digital signals are then reformatted within the IC for further processing by the IC.

8 Claims, 8 Drawing Sheets

METHOD AND APPARATUS FOR EXTERNAL INTERMEDIATE DATA PROCESSING

This is a continuation of application Ser. No. 08/192,057, filed Feb. 4, 1994.

CROSS-REFERENCE TO RELATED APPLICATIONS

This application is related to the following U.S. Patent Applications:

| SERIAL NO. | TITLE | INVENTOR(S) |
| --- | --- | --- |
| 07/917,497 | General I/O Port Interrupt Mechanism | Gulick, et al. |
| 07/917,489 | Improved External Memory Access Control for a Processing Unit | Gulick, et al. |
| 07/917,488 | Method of Weak Pull-up Disable and Mechanism Therefor for Use with Microcontroller in Integrated Circuit and Cordless Telephone Using the Integrated Circuit | Bowles, et al. |
| 07/917,503 | Interrupt Mask Disable Circuit and Method | Bowles, et al. |
| 07/918,627 | Integrated Circuit and Cordless Telephone Using the Integrated Circuit | Gulick, et al. |
| 07/918,626 | Modulator Test System | Peterson, et al. |
| 07/918,625 | Keypad Scanner Process and Device and Cordless Telephone Employing the Mechanism | Gulick |
| 07/918,624 | Serail Interface Module and Method | Gulick, et al. |
| 07/918,631 | Low Power Emergency Telephone Mode | Peterson, et al. |
| 07/918,632 | In-Circuit Emulation Capability Mode in Integrated Circuit and Cordless Telephone Using the Integrated Circuit | Gulick, et al. |
| 07/918,622 | Clock Generator Capable of Shut-down Mode and Clock Generation Method | Petersen, et al. |
| 07/918,621 | Signal Averager | Gulick |
| 08/192,007; | Power Management Circuit for Use in Digital Cordless Telephones and Like Apparatus | Hendrickson, et al. |
| 08/191,940; | Apparatus and Method for Sending Signal Data | Schnizlein, et al. |
| 08/191,940; | Burst Synchronization of Time Division Multiplexed Transceiver Pairs | Schnizlein |
| 08/191,994; | Receiver Quality Measurement System for Use in Digital Cordless Telephones and Like Apparatus | Hendrickson, et al. |
| 08/192,046; | Dual-Mode Baseband Controller for Radio-Frequency Interfaces Relating to Digital Cordless Telephones | Hendrickson, et al. |
| 08/192,009; | Metal Programmed Transistor Array | Allee |
| 08/191,948; | Input/Output Data Port and Method | Mullins, et al. |
| 08/191,818; | Method and Apparatus for Improved Link Establishment and Monitoring in a Communications System | Hendrickson |

All of the related applications are assigned to the assignee of the present invention and are hereby incorporated herein in their entirety by this reference thereto.

BACKGROUND

1. Field of the Present Invention

The present invention relates to telecommunication controllers (i.e., IC) and, more particularly, external intermediate data processing for such controllers.

2. History of the Related Art

The cordless telephone industry is currently in a state of expansion and transition. Several cordless telephone system standards have been previously developed. Currently these existing standards collectively require different types of data processing.

Additionally, new system standards for data processing are required by various countries to contend with the expansion of the cordless telephone industry. One standard, Cordless Telephony Generation 2 (CT2) interface specification for digital technology, is currently widely followed in the United Kingdom and certain European countries. The CT2 standard has been accepted by the European Telecommunications Standard Institute (ETSI) as an interim European standard. Unfortunately, not all countries have adopted the same standard. For example, the U.S follows a standard that is different than the CT2 standard.

Current cordless telephone controllers utilized by the telecommunication industry, such as, for example, Am79C410 controller (i.e., IC) manufactured by Advanced Micro Devices (AMD), perform data processing internally. Since the data processing is internal, the controller must be redesigned each time requirements or standards change so that the data processing complies with the new specifications and standards. Redesign and fabrication of new controllers is expensive and time consuming. Furthermore, fabrication lot sizes must be carefully calculated to avoid creating an excess inventory of outdated controllers.

It would be a distinct advantage to have a controller which is not heavily dependent upon an internal data processing capability. If the controller's data processing could be upgraded without redesigning and fabricating a new controller, larger quantities of controllers could be manufactured, thereby achieving lower unit costs. Furthermore, the data processing capability of the controller could be upgraded more frequently to meet ever-changing specifications and standards. Providing a controller with a design that is not heavily dependent upon an internal data processing capability eliminates the need to design a new controller for each new data processing implementation. The present invention provides a controller with these advantages.

SUMMARY

In certain embodiments, the present invention includes methods and systems for external data processing. In one such embodiment, the invention is a system for selectively enabling intermediate data processing of digital signals external to an integrated circuit (IC). The system includes a trans coder and a codec connected to the transcoder. The system further includes a data processor located externally to the IC. Additionally, the system includes means for selectively diverting the digital signals, transmitted between the transcoder and the codec, to the external data processor for external processing of the digital signals. The system further includes means for returning the externally processed digital signals to the IC.

BRIEF DESCRIPTION OF THE DRAWING

The present invention will be better understood and its numerous objects and advantages will become more apparent to those skilled in the art by reference to the following drawings, in conjunction with the accompanying specification, in which.

DETAILED DESCRIPTION

The preferred embodiment of the present invention may be implemented in a controller 10 as illustrated in FIG. 1. The controller 10 may be, for example, the Am79C410A CT2 manufactured by Advanced Micro Devices (AMD). An earlier version of the controller 10 (Am79C410) is described in more detail in co-pending U.S. patent application Ser. No. 07/918,627 and titled "INTEGRATED CIRCUIT AND CORDLESS TELEPHONE USING THE INTEGRATED CIRCUIT" and filed Jul. 21, 1992 by Gulick, et al., which is incorporated herein by reference.

Referring to FIG. 1, a controller for data processing is indicated generally at 10. The controller may be, for example, the Am79C410A CT2 controller or some other controller. The controller generally includes a transcoder 102 and a codec 101.

Figure 2:
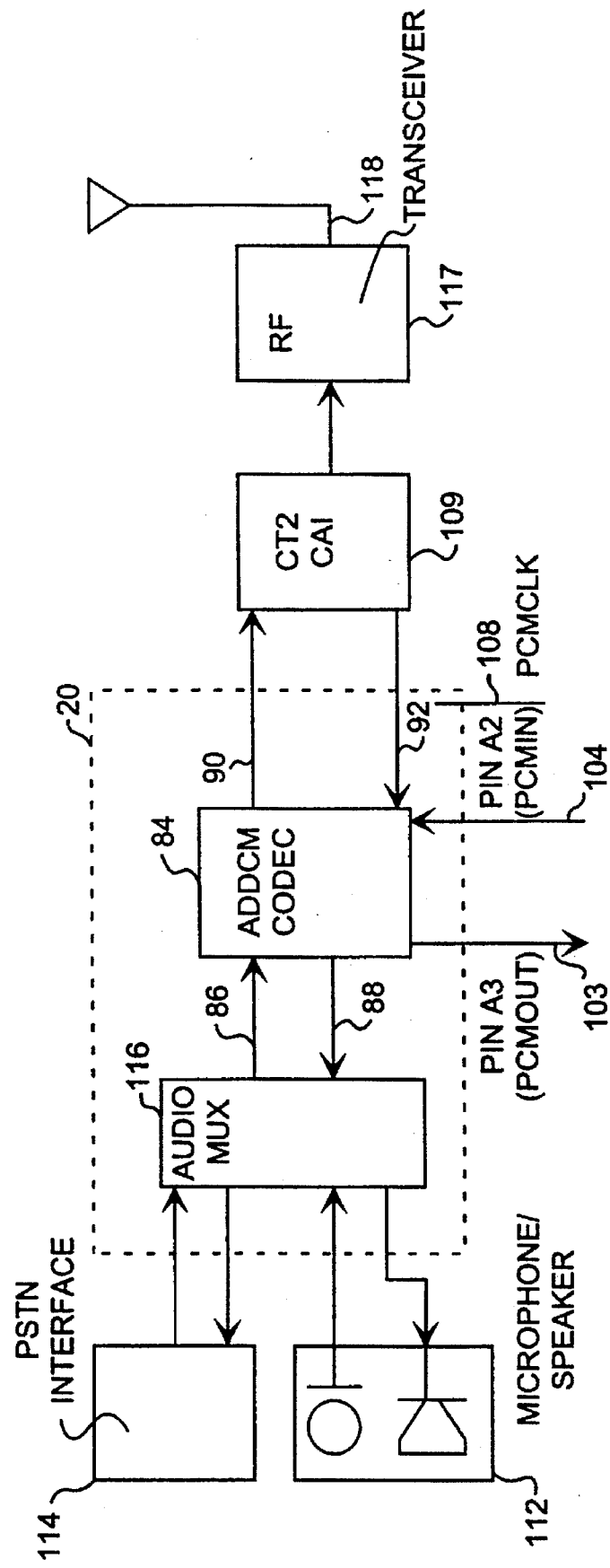
FIG. 2. (PRIOR ART) is a block diagram illustrating an Adaptive Differential Pulse Code Modulation (ADPCM) coder/decoder (codec) of an exemplary prior version of a controller.

Referring now to FIG. 2, an exemplary prior version of a controller 20 is illustrated, which controller includes an ADPCM codec device 84. Adaptive Differential Pulse Code Modulation (ADPCM) is a speech coding method which calculates the difference between two consecutive speech samples in standard PCM coded telecom voice signals. A coder/decoder (codec) converts a digital signal to an analog signal, and an analog signal to a digital signal. The ADPCM codec 84 at FIG. 2 generally includes an ADPCM input 86, an ADPCM output 88, a codec input 92 and a codec output 90. The ADPCM output 88 and ADPCM input 86 communicate with an audio multiplexer 116. A multiplexer is an electronic circuit which allows two or more signals to proceed over one communications circuit. The audio multiplexer 116 transmits signals to and from a Public Switched Telephone Network (PSTN) interface 114 and to and from a microphone/speaker 112.

Still referring to FIG. 2, a CT2 Common Air Interface (CAI) 109 receives the codec output 90 and transmits a signal for codec input 92. The CT2 CAI 109 performs CT2 formatting for a radio frequency (RF) transceiver 117 which includes an antenna 118. The controller 10 also provides a PCM clock signal (PCMCLK) 108 for use by external circuitry. The ADPCM codec 84 performs all data processing internally and does not provide access for external intermediate data processing.

Figure 3:
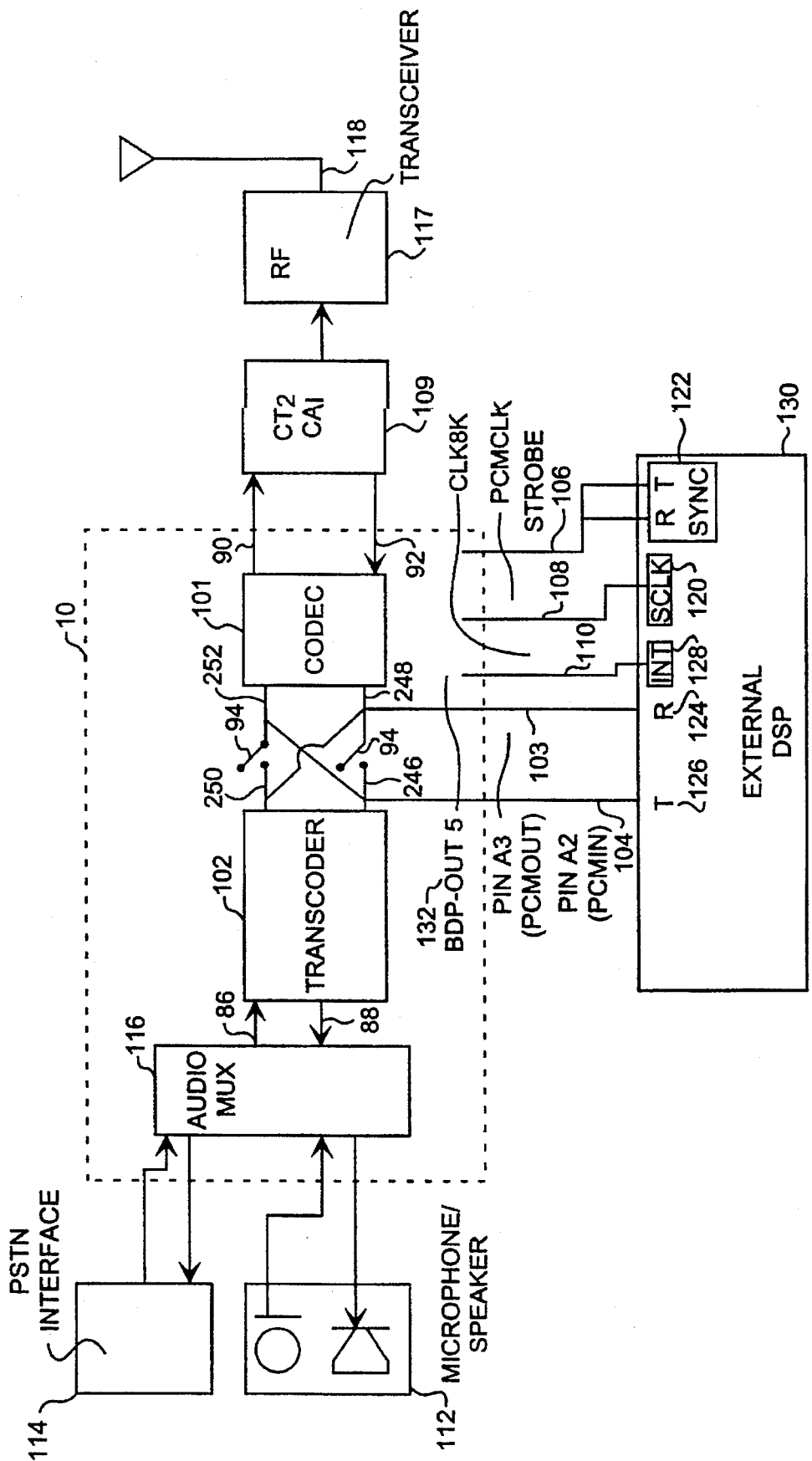
FIG. 3 is a block diagram illustrating a transcoder and a codec which reflect the ADPCM codec of FIG. 2 of the preferred embodiment of the present invention.

Referring now to FIG. 3, according to the preferred embodiment of the present invention, the ADPCM codec 84 is replaced by a transcoder 102 and a codec 101 as illustrated in FIG. 3. This embodiment of FIG. 3 further illustrates how digital signals transmitted between the transcoder 102 and the codec 101 are diverted for external intermediate data processing. The controller 10 also provides an 8 kHz. clock signal (CLK8K) 110, the PCMCLK signal 108 and a Strobe 106, for use by external circuitry. The physical separation of the transcoder 102 and codec 101, within the controller, provides the capability for external intermediate data processing by external circuitry, such as, for example, an external DSP 130.

Further referring to FIG. 3, external intermediate data processing in the preferred embodiment is implemented by providing the capability to divert digital signals which are transmitted between the transcoder 102 and codec 101. The transmitted digital signals are diverted by utilizing a programmable switch 94. If the programmable switch 94 is closed, all processing of digital signals is performed internally within the controller 10. However, if the programmable switch 94 is open, digital signals between the transcoder 102 and the codec 101 are diverted to the external DSP 112 for external intermediate data processing. A diverted digital signal from either the transcoder 102 or the codec 101 is accessed by external circuitry through the utilization of multiplexed pin A3 (PCMOUT) at 103. Once the external circuitry has performed the appropriate data processing, the processed digital signal is reinserted into the controller 10 through the utilization of multiplexed pin A2 (PCMIN) at 104.

Still referring to FIG. 3, external intermediate data processing in the preferred embodiment allows the implementation of external circuitry for features such as security/encryption, intercom, or handset hands-free only operations. The external intermediate data processing enables the implementation of new data processing features without the requirement that a new controller be created for each new or different data processing concept.

Figure 4:
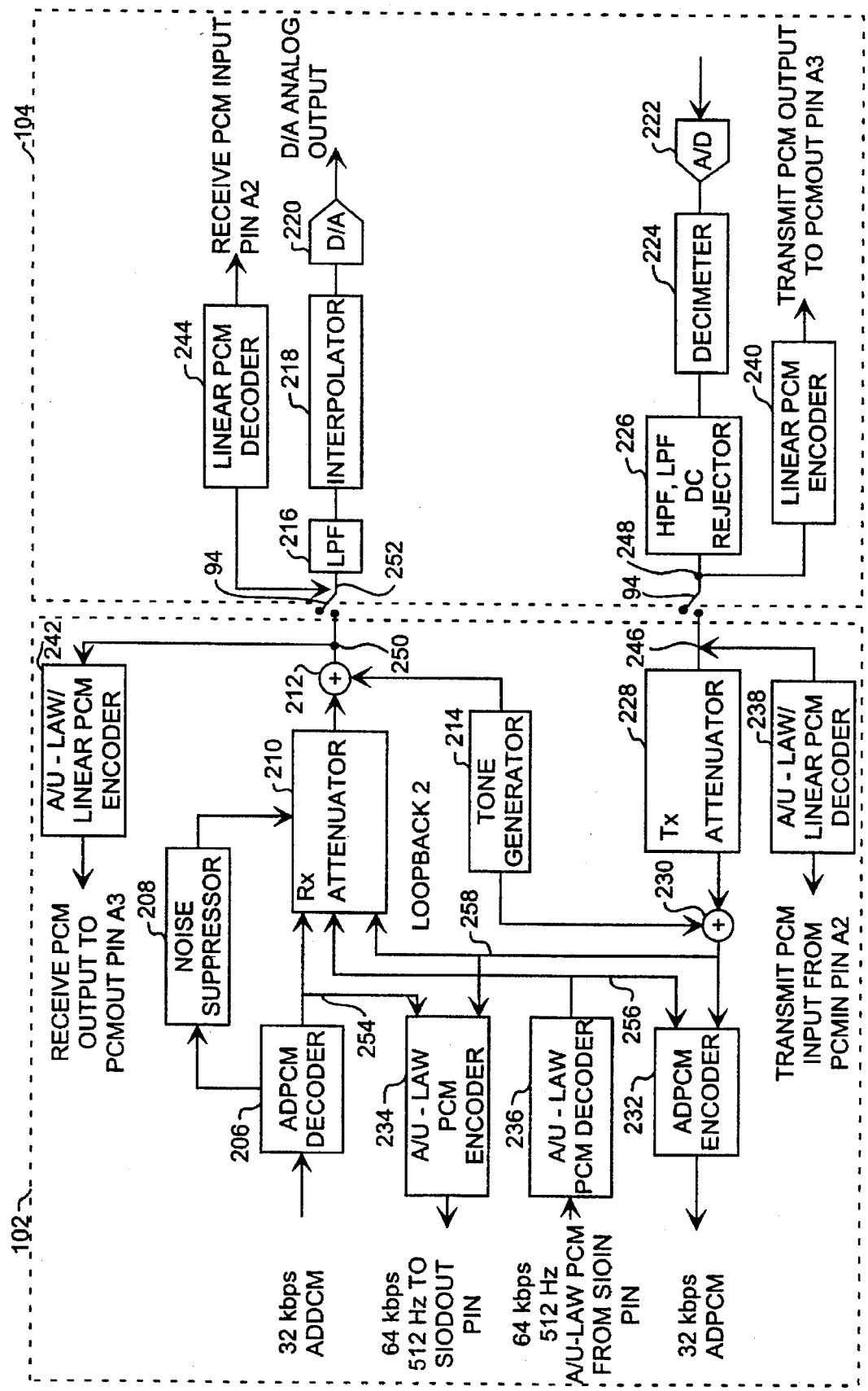
FIG. 4 is a schematic diagram illustrating the trans coder and codec of FIG. 3 in more detail in the preferred embodiment of the present invention.

Now referring to FIG. 4, a schematic representation of the codec 101 and the transcoder 102 of the preferred embodiment of the invention is illustrated in greater detail. In the embodiment, the transcoder 102 supports processing of PCM and digital streams. Pulse Code Modulation (PCM) is the most common method of encoding an analog voice signal into a digital bit stream. First, the amplitude of the voice conversation is sampled in a procedure Pulse Amplitude Modulation (PAM). The amplitude is then coded (quantized) into a binary (digital) number (i.e., zeros and ones). Adaptive Differential Pulse Code Modulation (ADPCM) is a speech coding method which calculates the difference between two consecutive speech samples in standard PCM coded telecom voice signals. The transcoder 102 supports the following formats for the PCM digital signal stream: A-law, μ-law and linear.

Still referring to FIG. 4, the transcoder 102 of the preferred embodiment is comprised of the following: an ADPCM decoder 206, a noise suppressor 208, an Rx (receive) Attenuator 210, a first summation device 212, a tone generator 214, a Tx (transmit) attenuator 228, a second summation device 230, an ADPCM encoder 232, an A/μ-law PCM decoder 236, an A/μ-law PCM encoder 234, an A/μ-law/linear PCM decoder 238, an A/μ-law/linear PCM encoder 242, a transcoder input port path 246, a transcoder output port path 250, an ADPCM to A/μ-law path 254, an A/μ-law to ADPCM path 256 and a loopback 2 258.

Continuing to refer to FIG. 4, in the preferred embodiment, the codec 101 performs the necessary operations for converting a digital signal to an analog signal, and an analog signal to a digital signal. The codec of the embodiment is comprised of the following: a low pass filter (LPF) 216, an interpolator 218, a D/A converter 220, a linear PCM encoder 244, an A/D converter 222, a Decimator 224, a high pass filter (Hpf), low pass filter (Lpf), direct current (DC) rejector 226, a linear PCM encoder 240, a codec output port path 248 and a codec input path 252.

Still referring to FIG. 4, the transcoder 102 of the preferred embodiment receives digital signal data streams in the following formats: 32 kilobytes per second (kbps) ADPCM, and 64 kbps operating at 512 Hertz (Hz) A-law, μ-law, and 128 kbps linear PCM. The 32-kbps ADPCM digital signal stream is in ADPCM format and is received by the ADPCM decoder 206 which converts the ADPCM data stream into a linear digital signal format (digital signal). The 64-kbps data stream must be in either A-law or μ-law PCM format and is received by the A/μ-law PCM decoder 236, which converts the received data stream into a linear digital signal format (digital signal). The digital signal from the ADPCM decoder 206 is received by the noise suppressor 208 and Rx (received) attenuator 10. The noise suppressor 208 analyzes the digital signal and outputs an appropriate signal to mute the digital signal if it is not human speech (i.e., noise). The digital signal from the A/μ-law PCM decoder 236 is also received by the Rx attenuator 210. The Rx attenuator 210 attenuates the received digital signal by creating a certain amount of loss to the digital signal's amplitude. The Rx attenuator 210 is programmable and is affected by the noise suppressor 208. A summing device 212 performs summing of a tone generated by the tone generator 214 and the received digital signal from the Rx attenuator 210. The output from the summing device 212 is a voice plus tone digital signal and is received by either the low pass filter 216, or the A/μ-law/linear PCM encoder 242 (via transcoder output port path 250). The low pass filter 216 manipulates the shape of the digital signal spectrum before digital-to-analog conversion of the digital signal. The output from the low pass filter 216 is received by the interpolator 218. The interpolator 218 increases the sampling rate to a higher frequency so that improved resolution is achieved during the digital-to-analog conversion of the digital signal. The output from the interpolator 218 is received by D/A convertor 220 which converts the digital signal to an analog wave form representation.

Still referring to FIG. 4, in the preferred embodiment, an analog waveform is received by the A/D convertor 222 and converted to a linear digital signal representation (digital signal). The digital signal is received by Decimator 224 which decreases the sampling rate of the digital signal to about 32 kilohertz (kHz). The output from the Decimator 224 is received by the Hpf, Lpf and DC rejector 226. The high pass filter within block 226 cuts the frequency off at about 3.9 kilohertz (kHz), and the low pass filter within block 226 cuts the frequency off at about 60 hertz (for A/C type interference). The DC rejector within block 226 removes any DC offset. The output from the Hpf, Lpf and Dc rejector 226 is received by Tx (transmit) attenuator 228 (Tx) or the linear PCM encoder 240 (via codec output port path 148). The Tx attenuator 228 provides gain control for the digital signal and is programmable. The output from the Tx attenuator 228 is received by a summing device 230. The summing device 230 sums the digital signal from the tone generator 214 with the received digital signal from the Tx attenuator 228. The output signal from the summing device 230 is received by the ADPCM encoder 232, the A/μ-law PCM encoder 234 or the Rx attenuator 210 (via loopback 2 at 258). The ADPCM encoder 232 converts the digital signal into ADPCM format operating at 32 kbps. The A/μ-law PCM encoder 234 converts the digital signal into either A-law or μ-law PCM format operating at 64 kbps with a frequency of 512 khz. The ADPCM to A/μ-law path 254 provides the capability to convert a digital signal from the ADPCM decoder 206 into either an A-law or μ-law PCM format operating at 64 kbps with a frequency of 512 khz. The A/μ-law to ADPCM path 256 provides the capability to convert a digital signal from the A/μ-law PCM decoder 234 into an ADPCM signal operating at 32 kbps.

Further referring to FIG. 4, intermediate data processing of the digital signal by external circuitry is implemented in the preferred embodiment by connection to port paths 250 and 246 of the transcoder 102 and port paths 252 and 248 of the codec 101.

Continuing to refer to FIG. 4, the codec output port path 248 of the preferred embodiment allows the diversion of the digital signal before the transcoder 102 for external data processing. The codec output port path 248 is provided with a linear PCM encoder 240 which receives the diverted digital signal and converts it to a linear PCM format. Once the external processing of the digital signal has been accomplished the processed digital signal is inserted via transcoder input port path 246. However, the processed digital signal must be in one of the following formats: A-law, μ-law or linear PCM. The transcoder input port path 246 accesses the transcoder 102 before the Tx attenuator 228 and is provided with an A/μ-law/linear PCM decoder 238, which converts the processed digital signal into a linear digital signal for the Tx attenuator 228.

Still referring to FIG. 4, the trans coder output port path 250 of the preferred embodiment allows the diversion of the digital signal before the codec 101 for external data processing. The transcoder output port path 250 is provided with an A/μ-law/linear PCM encoder 242 which converts the digital signal to either A-law, μ-law or linear PCM format. Once the external processing of the diverted digital signal has been accomplished the processed digital signal is inserted via codec input port path 252. However, the processed digital signal must be in linear PCM format. The codec input port path 252 accesses the codec 101 before the Lpf 216, and is provided with a linear PCM encoder 244 which converts the processed digital signal into a linear digital signal for the Lpf 216.

Figure 5:
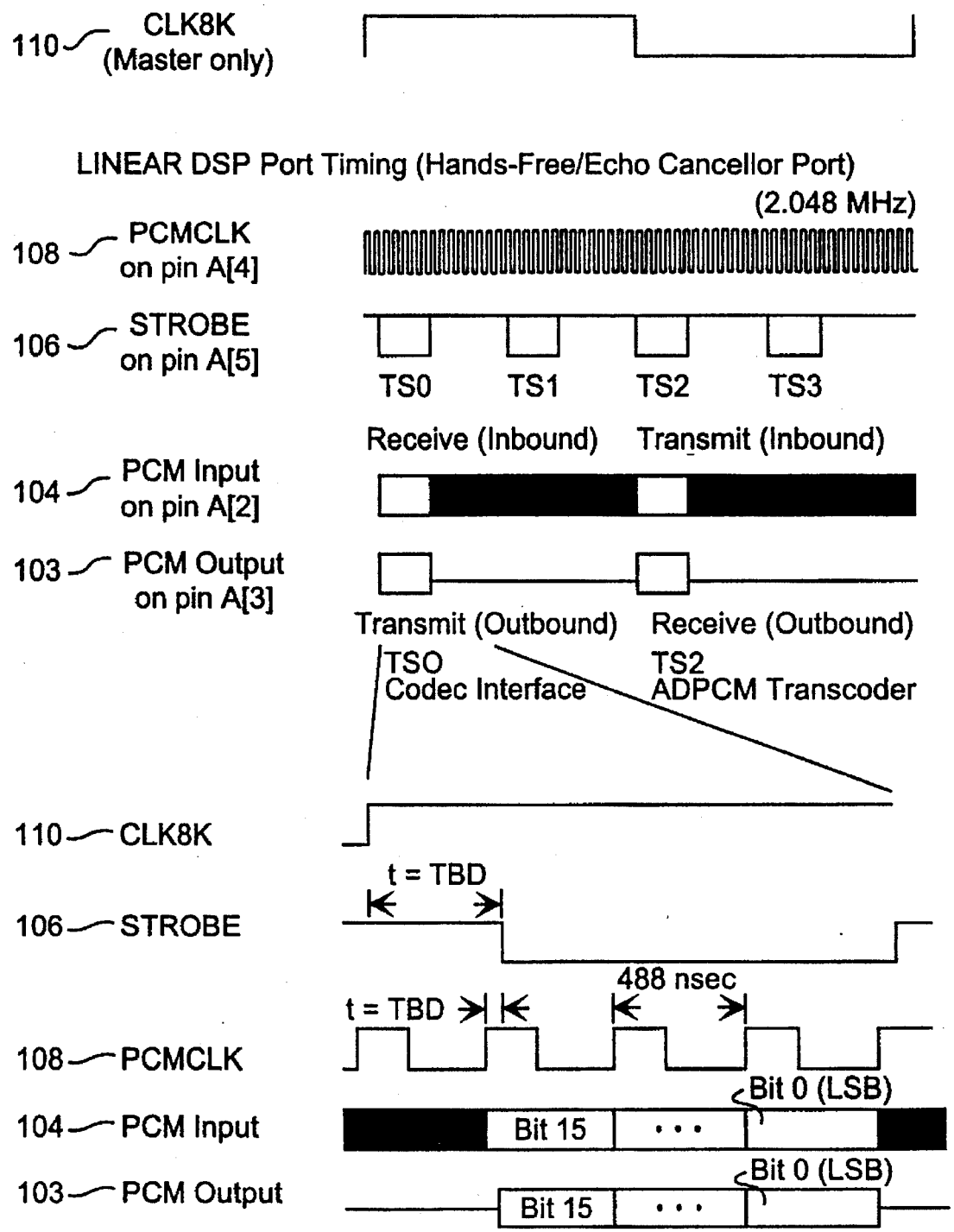
FIG. 5 is a timing diagram illustrating timing sequences utilized for intermediate data processing that may be employed in the transcoder and codec of FIG. 4 in the preferred embodiment of the present invention.

Now referring to FIG. 5, the preferred embodiment of interface timing for external processing of the diverted digital signals from the transcoder 102 and the codec 101 is illustrated. In the embodiment, the internal 8-kHz frame synchronization clock signal 110 (CLK8K) is phase-locked to an input 500-Hz. CT2 frame sync, so that the rising edge of the internal CLK8K signal corresponds to the 500-Hz transitions. As was shown in FIG. 3, pin BDP3_OUT5 132 transmits the CLK8K signal 110 to external circuitry such as the DSP 130. The Bit Data Multiplex (BDMUX) register, bits [6:5], are utilized for this purpose.

Still referring to FIG. 5, the interface timing between the external circuitry, for example, an external DSP 130, and the controller may be coordinated in the preferred embodiment by strobe output 106. In that event, strobe output 106 may produce four pulses (TS0–TS3) during a single frame of the CLK8K signal 110 and is provided on pin A5. The first and third strobe pulses, TS0 and TS2, may be utilized by external circuitry for the receipt and transfer of a digital signal from the port paths of either the transcoder 102 or the codec 101. In this arrangement, if the strobe output 106 is active during the first strobe pulse (TS0), the external circuitry may interface with the codec port paths 248 and 252, and/or if the strobe output 106 is active during the third strobe pulse (TS2), the external circuitry may interface with the transcoder port paths 246 and 250. The defining of the two strobe pulses in this instance may be required, since port paths for the transcoder and the codec are multiplexed (via pin A3 (PCMOUT) 103 and pin A2 (PCMOUT) 104). Further in the arrangement, the other two pulses, TS1 and TS3, may be utilized by external circuitry acting as a slave to the controller.

Still referring to FIG. 5, in the preferred embodiment, a register strobe enable (STROBEN) may be provided in the controller to enable and disable the four pulses that may be, as described, associated with the strobe output. The register STROBEN in such instance may be defined as indicated below.

Register: STROBEN
Address: FF2A

| Bit | Definition |
|---|---|
| 3 | Time slot 3 enable (last quadrant of 8 kHz frame). 0: =disable, 1: =enable. |
| 2 | Time slot 2 enable (third quadrant of 8 kHz frame). 0: =disable, 1: =enable. |
| 1 | Time slot 1 enable (second quadrant of 8 kHz frame). 0: =disable, 1: =enable. |
| 0 | Time slot 0 enable (first quadrant of 8 kHz frame). 0: =disable, 1: =enable. |

Still referring to FIG. 5, in the preferred embodiment, a DSPCTR register of the controller may have bits which are defined as indicated below.

| Bit | Definition |
|---|---|
| 4: 3 | Reserved |

2:0: Codec Path Configuration

A0 pin undriven at reset (A7-A0 pins used as address latch (default):
 000: Normal ADPCM Codec configuration (ADPCM-Analog)
 001: PCM Codec Configuration (A-law PCM at SDIN and SDOUT pins⇔Analog)
 010: Loop 2 (Analog⇔Analog)
 100: ADPCM Transcoder Configuration (A-law PCM at SDIN and SDOUT pins⇔ADPCM)

A0 pin driven to 0 at reset (A7-A0 pins redefined to be serial voice I/O)
 000: Normal (ADPCM⇔Analog)
 001: Linear DSP Port for Hands-Free/Echo Cancellation (ADPCM⇔Linear PCM on A5-A2, Linear PCM on A5-A2⇔Analog)
 010: Loop 2 (Analog⇔Analog)
 100: Reserved Further referring to FIG. 5, in the preferred embodiment, the STROBEN Register of the controller may be defined as indicated below.
4 Bypass Attenuators
 1: Allow TXATTN and RXATTN attenuators to attenuate signals and allow injection of dual tone signals, if appropriately programmed.
 0: Signals bypass the TXATTN and RXATTN attenuators and the dual tone generator is disabled. This configuration allows the controller to perform ADPCM⇔PCM transcoding functions with bit-for-bit compliance to CCITT G. 721 using the test sequences recommended by CCITT.

3:0: Codec Path Configuration
 1001: Linear Port ADPCM⇔Linear PCM on pins 59–62)
 0100: A-law ADPCM Transcoder Configuration (ADPCM⇔A-Law PCM on pins 58–62)
 1100: μ-law ADPCM Transcoder Configuration (ADPCM⇔μ-law PCM on pins 58–62)

Still referring to FIG. 5, access to the transcoder and codec paths in the preferred embodiment is provided by utilizing and redefining port 0's multiplexed address/data pins 0–7. In the embodiment, the status of pin A0 of the port 0's multiplexed address pins controls whether pins A1 through A7 are redefined for external data processing. The status of pin A0 is determined at the end of reset. If A0 is not externally driven low, the latched address port 0 will operate normally as an 8-bit address output port. If A0 is externally driven low, the address port drivers are disabled and the port is redefined as illustrated below.

| Pin | A0 = undriven (default) | A0 = 0 at reset and DSPCTR[2:0] ≠ 001 or 100 | A0 = 0 at reset and DSPCTR[2:0] = 001 |
|---|---|---|---|
| ALE CLK4M | CLK4M output or ALE output or ALE input | ALE output or ALE input | ALE output or ALE input |
| A7 | Address 7 output | CLK4M output | CLK4M output |
| A6 | Address 6 output | Reserved. Do not connect. | Reserved. Do not connect |
| A5 | Address 5 output | High (weak int pull-up) | STROBE output |
| A4 | Address 4 output | High (weak int pull-up) | PCMCLK output |
| A3 | Address 3 output | High (weak int pull-up) | TDMed TX/RX PCM output |
| A2 | Address 2 output | High (weak int pull-up) | TDMed TX/RX PCM Input |
| A1 | Address 1 output | Reserved. Do not connect. | Reserved. Do not connect. |
| A0 | Address 0 output | Mode select 0 (tie to Vss) | Mode select 0 (tie to Vss) |
| SCLK | Serial Port clock out or PCM clock out | Serial Port clock only | Serial Port clock only |
| SDIN | Serial Port data in or PCM data in | Serial Port data in only | Serial Port data in only |
| SDOUT | Serial Port data out or PCM data out | Serial Port data out only | Serial Port data out only |

Referring again to FIG. 3, an example is shown of utilizing, in the preferred embodiment, the port paths provided by the transcoder 102 and the codec 101 by an external DSP 130. In the embodiment, the external DSP 130 processes the diverted signals (data) to provide an intercom or handset hands-free only operation. The external DSP 130 is physically connected to the controller 10 in the following manner: the CLK8K signal (via pin BDP3_OUT5) is connected to interrupt control (INT) 128. The PCMCLK signal 108 is connected to slave clock (SCLK) 120, Synchronization of receive (R) pin 124 and transmit (T) pin 126 is coordinated by connecting the strobe output 106 to RT Sync 122. Pin R 124 is connected to pin A3 103 in order to receive and process diverted data (signals). Pin T 126 is connected to Pin A2 104 so that processed data from the external DSP 112 can be transmitted to either the transcoder 102 or the codec 101.

Numerous modifications and variations of the embodiments and, in particular, the preferred embodiments of the invention are possible in light of the teachings herein. For example, although the description has disclosed the use of an array of transistors in one possible embodiment of a ROM core, other transistor arrays or other arrangements may be used in other devices, such as, for example, a PLA, or the like. Each of these modifications and variations are intended to be included in the description herein and form a part of the present invention. The foregoing detailed description is, thus, to be clearly understood as being given by way of illustration and example only, the spirit and scope of the present invention being limited solely by the appended claims.

What is claimed is:

1. A system of selectively enabling intermediate data processing of digital signals within an integrated circuit (IC) including a transcoder and a codec connected to said transcoder, comprising;

a data processor external to said IC;

circuit for selectively diverting digital signals transmitted between said transcoder and said codec to said external data processor for external processing of said digital signals;

circuit for returning said externally processed digital signals to within said IC, and said circuit for selectively diverting digital signals within said IC to said external data processor including a programmable switch of said IC which serves to selectively divert said digital signals within said IC in response to a select timing signal of said IC; and a data path coupling said IC to said external processor for passage of said selectively diverted digital signals within said IC to said external data processor.

2. The system of claim 1 wherein said circuit for returning said externally processed digital signals to said IC includes:

a data path coupling said external processor to said IC; and means for formatting said digital signals for compatibility for further processing by said IC.

3. A system, said system receiving an input analog signal and producing a recaptured analog signal and said system receiving a control signal having at least a first state, comprising:

a processing unit;

a controller operably connected to said processing unit, said controller including pulse code modulation circuitry for receiving a compressed digital signal and converting the compressed digital signal to a noncompressed digital signal and for receiving a processed digital signal and compressing the processed digital signal into a compressed digital signal and including analog and digital conversion circuitry for receiving said input analog signal and converting said input analog signal to a digital analog signal and receiving a processed noncompressed signal and converting the processed noncompressed signal to a recaptured analog signal; and switching means, operably coupled to said pulse codec modulation circuitry and said analog and digital conversion circuitry, for switching data routing between the processing unit, the pulse code modulation circuitry, and the analog and digital conversion circuitry;

wherein said switching means, based on said control signal being in said first state, couples said pulse code modulation circuitry and said analog and digital conversion circuitry to said processing unit, enabling said processing unit to process said digital analog signal to produce said processed digital signal and to process said noncompressed digital signal to produce said processed noncompressed signal.

4. The system of claim 3, wherein said switching means further functions to cause said analog and digital conversion circuitry to receive, as said processed noncompressed signal, said noncompressed digital signal from said pulse code modulation circuitry and to cause said pulse code modulation circuitry to receive, as said processed digital signal, said digital analog signal when said control signal is in a second state.

5. The system of claim 3, wherein said control signal comprises a strobe signal.

6. A method for intermediate data processing, comprising the steps of:

digitizing an analog signal in a first portion of a circuit to produce a digitized analog signal;

receiving said digitized analog signal via an external processor when a control signal is in a first state;

processing said digitized analog signal via said external processor to produce a processed digital signal;

receiving said processed digital signal into a second portion of said circuit via said external processor when said control signal is in said first state;

receiving an encoded digital signal from said second portion of said circuit into said external processor when said control signal is in said first state; and providing a processed encoded signal to a controller of said first portion of said circuit when said control signal is in said first state.

7. The method of claim 6, wherein said step of receiving said digitized analog signal and said processing step are performed within a single clock cycle.

8. The method of claim 7, further comprising the steps of:

receiving said digitized analog signal via a transcoder of said circuit when said control signal is in a second state; and receiving said encoded digital signal via a codec of said circuit when said control signal is in said second state.

* * * * *

UNITED STATES PATENT AND TRADEMARK OFFICE
CERTIFICATE OF CORRECTION

| | | |
|---|---|---|
| PATENT NO. : | 5,657,351 | |
| DATED : | August 12, 1997 | |
| INVENTOR(S) : | Mullins et al. | |

It is certified that error appears in the above-identified patent and that said Letters Patent is hereby corrected as shown below:

In the Drawing:

Cover Page: change "TRANSCODER" to --CODEC--; change 'CODEC" to --TRANSCODER--; change reference numeral "102" to --101--; change reference numeral "101" to --102--; change "BDP-OUT 5" to --BDP3-OUT 5--.

Figure 1A:
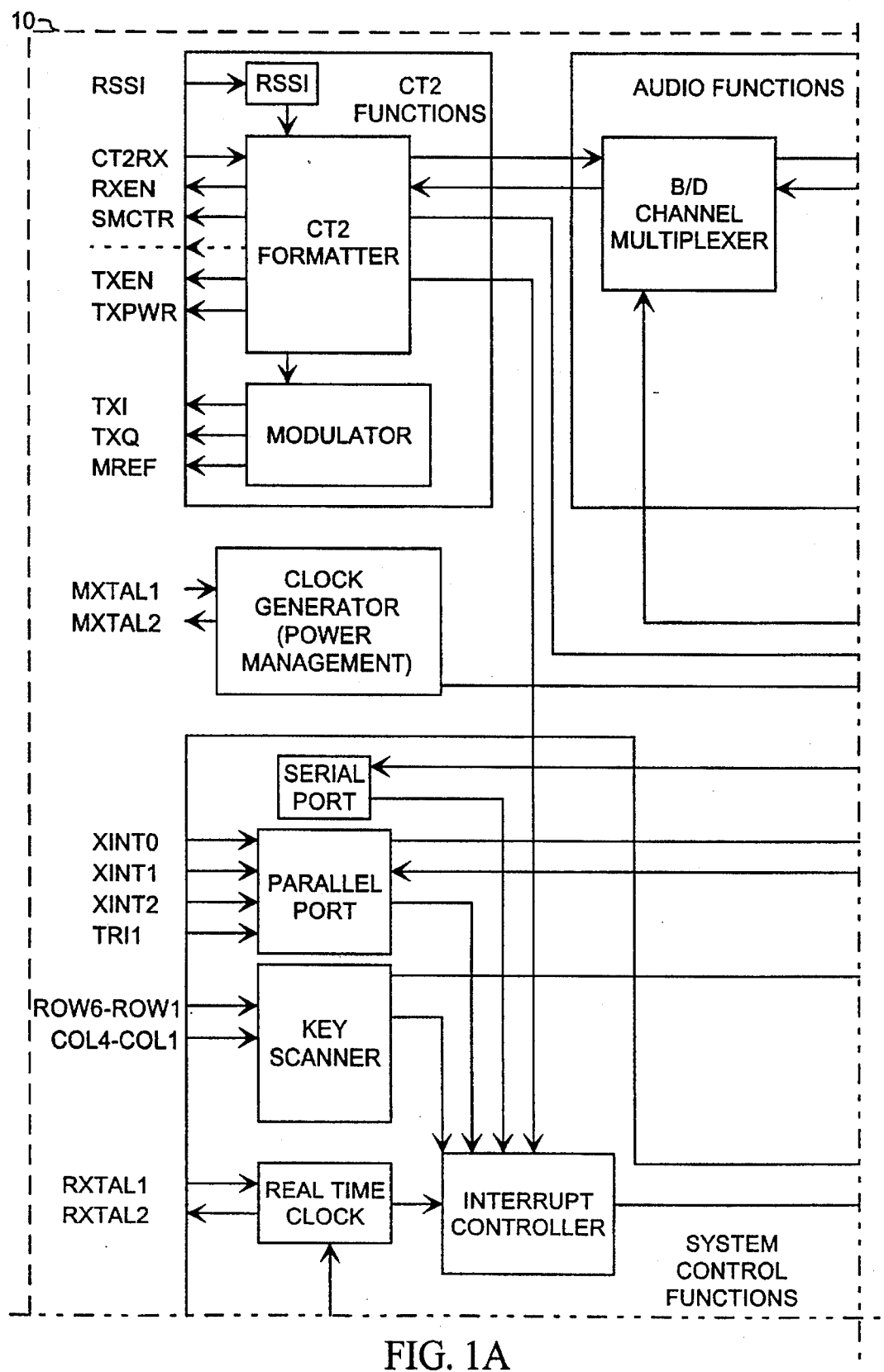
FIG. 1 is a block diagram of a controller for a digital cordless handset and base station utilizing the preferred embodiment of the present invention.
Figure 1B:
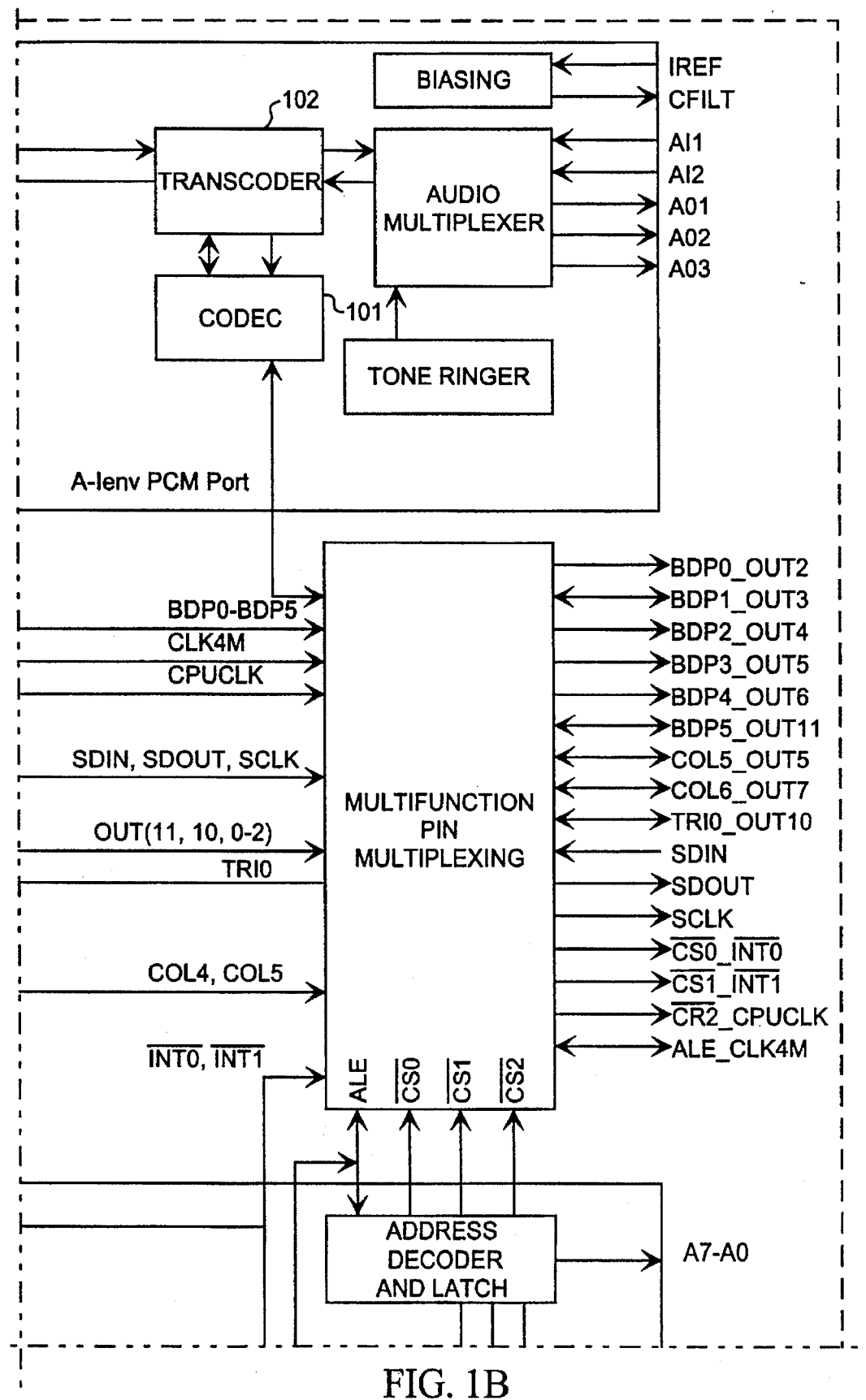
Figure 1C:
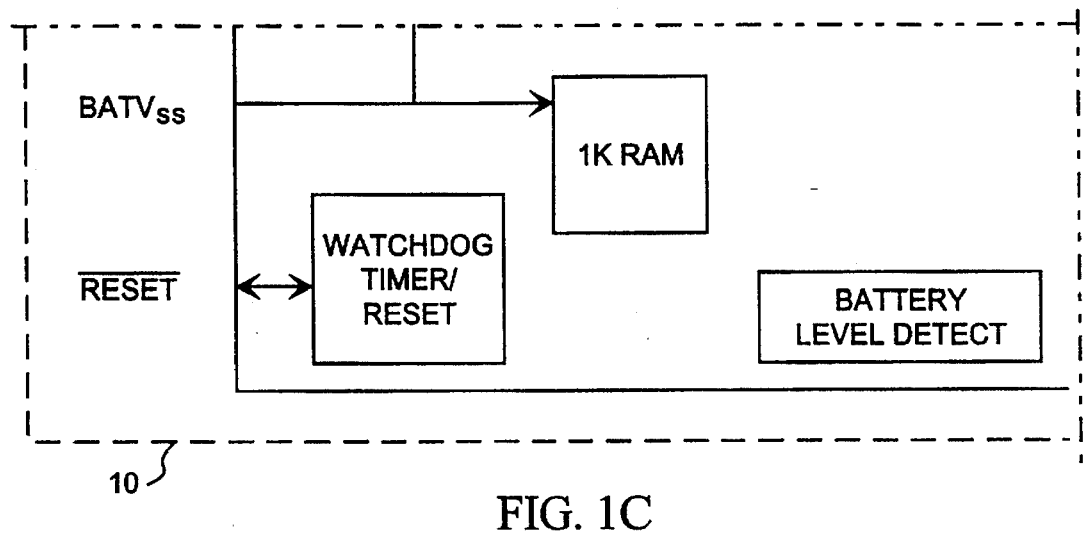

On sheet 1, FIG. 1A, change "SMCTR" to --SHCTR--.

Figure 1D:
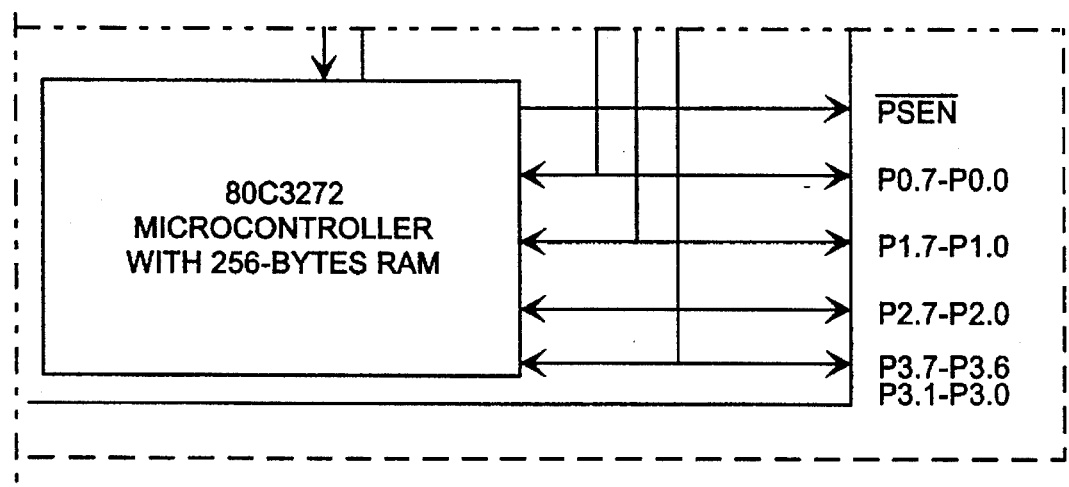

On sheet 4, FIG. 1D, change "80C3272" to --80C32T2--.

On sheet 5, FIG. 2, change "ADDCM" to --ADPCM--.

On Sheet 6, FIG. 3, change "TRANSCODER" to --CODEC--; change "CODEC" to --TRANSCODER--; change reference numeral "102" to --101--; change reference numeral "101" to --102--; change "BDP-OUT 5" to --BDP3-OUT 5--.

On sheet 7, FIG. 4, change "ADDCM" to --ADPCM--; change "FROM SIOIN" to --FROM SIODIN--; change reference number "104" to --101--; change "DECIMETER" to --DECIMATOR--; with respect to the direction 91 line beginning at decoder 238 and ending at text block "TRANSMIT PCM INPUT FROM PCMIN PIN A2" reverse the direction; with respect to the directional line that begins at decoder 244 and ends at text block "RECEIVE PCM INPUT PIN A2", reverse the direction.

In sheet 8, FIG. 5, Strobe Timing Signal 106 should be broken to coincide with the portions of PCM Input Signal 104 and PCM Output Signal 103 having "..."; in PCMCLK Signal 108, the timing interval indicated as "488 nsec" should be shifted one clock cycle to the right; and the PCMCLK Signal 108 should be broken to coincide with the broken portion of Strobe Signal 106.

UNITED STATES PATENT AND TRADEMARK OFFICE
CERTIFICATE OF CORRECTION

PATENT NO. : 5,657,351

DATED : August 12, 1997

INVENTOR(S) : Mullins et al.

It is certified that error appears in the above-identified patent and that said Letters Patent is hereby corrected as shown below:

In column 3, at line 50, change "86" to --92--; at line 51, change "88" to --90--; at line 51, change "92" to --86--; at line 52, change "90" to --88--; at line 52, change both occurrences of "ADPCM" to --codec--; at line 60, change "codec" to --ADPCM--; at line 61, change "codec" to --ADPCM--.

In column 4, line 23, change "112" to --130--.

In column 5, at line 5, change "encoder" to --decoder--; at line 12, delete "operating at 512 Hertz", at line 60 change "148" to --248--.

In column 6, at line 4, delete "with a"; in line 5, delete "frequency of 512 khz"; in line 10 change "234" to --236--; on line 43, change "encoder" to --decoder--.

In column 7, at line 8, change "pin A2 (PCMOUT)" to --pin A2 (PCMIN)--; at line 48, change "Loop" to --Loopback--; at line 57, change "Loop" to --Loop back--; at line 58, begin a new paragraph before the word "Further"; at line 60, change "ofthe" to --of the--

UNITED STATES PATENT AND TRADEMARK OFFICE
CERTIFICATE OF CORRECTION

PATENT NO. : 5,657,351
DATED : August 12, 1997
INVENTOR(S) : Mullins et al.

It is certified that error appears in the above-identified patent and that said Letters Patent is hereby corrected as shown below:

In column 8, at line 4, change "59-62" to --A5-A2--; at line 6 change "58-62" to --A6-A2--; at line 8 change "58-62" to --A6-A2--; at line 11 change "port 0's" to --the latched address port's--; in line 11, delete "address/data"; at line 12, change "port" to --the latched address port's--; in line 13 delete "0's" and "address"; at line 16, delete "0"; at line 63, change "112" to --130--; at line 67, delete "For".

In column 9, beginning at line 1, delete "example, although the description has disclosed the use of an array of transistors in one possible embodiment of a ROM core, other transistor arrays or arrangements may be used in other devices, such as, for example, a PLA, or the like."

Signed and Sealed this

Thirteenth Day of October 1998

*Attest:*

*Attesting Officer*

BRUCE LEHMAN
*Commissioner of Patents and Trademarks*